Patented July 24, 1951

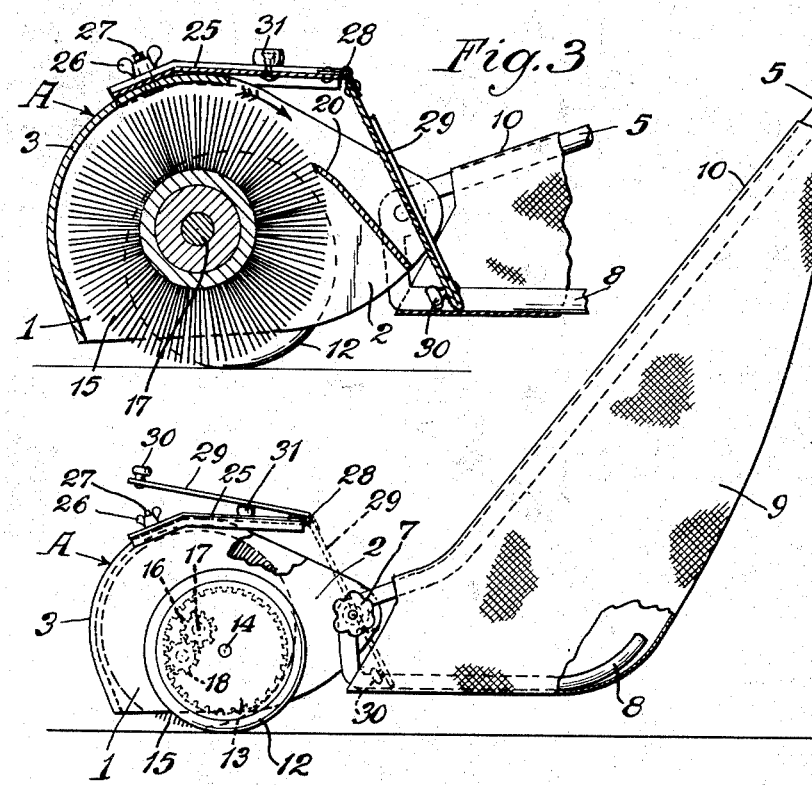
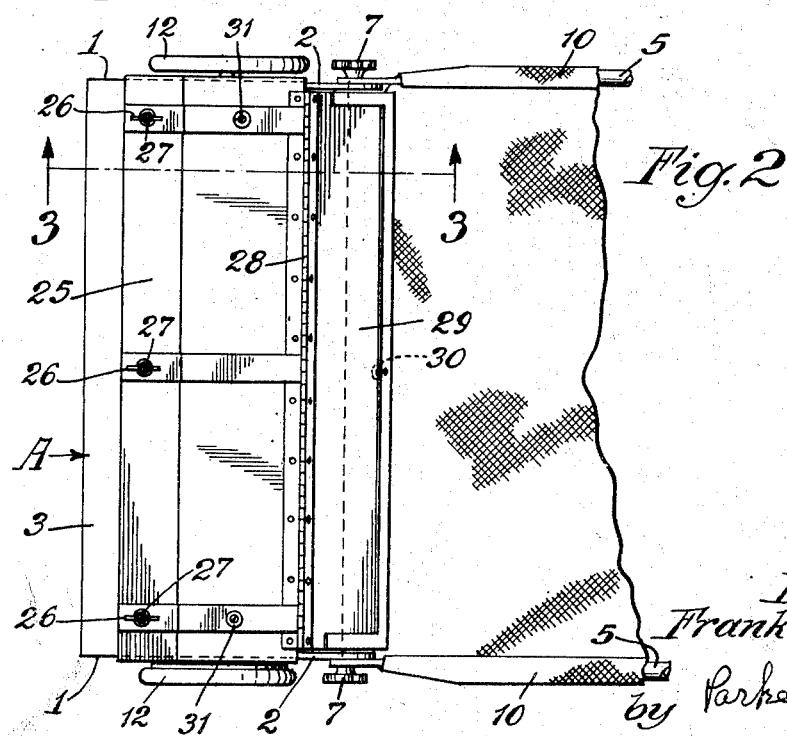

2,561,500

UNITED STATES PATENT OFFICE 2,561,500

LAWN CLEANER

Frank D'Astici, Glencoe, Ill.

Application February 14, 1948, Serial No. 8,479

3 Claims. (Cl. 15—83)

My invention relates to an improvement in lawn sweepers, and has for one purpose to provide a compact and efficient lawn sweeper from which the leaves or sweepings can readily be dumped.

Another purpose is to provide an improved and removable means or fender adapted to prevent the leaves, in the course of dumping, from entering the lawn sweeper housing.

Other purposes will appear from time to time in the course of the specification and claims.

I illustrate my invention more or less diagrammatically in the accompanying drawings wherein:

Figure 1 is a side elevation with parts broken away and in section;

Figure 2 is a plan view; and

Figure 3 is a section on the line 3—3 of Figure 2.

Like parts are indicated by like symbols throughout the specification and drawings.

Referring to the drawings, A generally indicates a lawn sweeper housing having side walls or plates 1, with rearwardly extending portions 2, the side plates being connected by a bowed forward cover or wall element 3. Any suitable additional braces or connections, not herein indicated in detail, may also be employed. I illustrate a handle which may be of hollow rod or tube stock, shown as having side arms 5 connected by a top cross-arm 6. The arms may be secured to the side plate extensions 2, for example, by any suitable locking screw or element controlled by the knurled handle 7. A lower frame 8 may also be secured to the side plate 2. If desired, the frame member 8 may be made unitary with the side arms 5. 9 generally indicates a receiving bag or member of any suitable material. It may, for example, be of cloth, and may be provided with tubular portions 10 which surround the side handle arms 5.

The housing A is supported by ground-engaging wheels 12, shown as having internal gears 13. The wheels rotate about any suitable axis 14, and it will be understood that they may be secured to or mounted on the side plates 1 in any suitable manner, being freely rotatable in relation thereto when the housing is moved by the operator. I employ the ground-engaging wheels 12 to rotate a suitable brush 15 in the direction of the arrow of Figure 3. The details of this brush do not, of themselves, form part of the present invention, and the driving connection may be widely varied. I illustrate, however, a driving connection including a pinion 16 on the brush shaft 17. This pinion is in mesh with an intermediate pinion 18, which, in turn, meshes with the internal gear 13. Thus, as the lawn sweeper is moved forwardly across the lawn, the frictional contact of the wheels 12 with the ground rotates the brush 15 in an opposite direction of rotation, and leaves or cuttings on the lawn are carried clockwise about the brush axis, referring to the position of the brush in Figures 1 and 3. The sweepings may be deflected by any suitable deflector blade 20 which may extend between the side plates 2.

Normally, the parts are in the position shown in Figure 1, and the leaves and cuttings are free to discharge into the interior of the bag or receiver 9. In normal operation they are projected with some force toward the rear of the bag 9. When the cuttings and leaves are to be dumped, I find it advantageous to provide means for preventing the cuttings from entering the interior of the brush housing. I therefore provide a normally fixed, but preferably removably attached, top cover plate 25 which may be secured to the fixed cover member 3, for example, by wing nuts 26 threaded on fixed screws or studs 27.

Hinged to the rear edge of the removable cover 25, as at 28, is a movable cover plate 29, with its handle 30. When the user wishes to dump the device, the movable cover 29 is moved from the full-line to the dotted-line position of Figure 1. Normally, however, it is in the full-line position of Figure 1, resting, preferably, upon any suitable bumper knob 31, which may, for example, be of yielding material. When the parts are moved to the dumping position, as shown in Figure 3, the operator then merely lifts the outer end of the handle 5, 6, upwardly, and the cuttings or leaves are dumped over and beyond the top of the now closed brush housing.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

I claim:

1. In a lawn cleaner body adapted for use with a lawn cleaning brush, a brush-receiving housing comprising a front wall and side walls defining a rear opening and a bottom opening, a top wall unit including a forward portion secured to said front wall and a rearward portion hingedly connected to the forward portion, said rearward portion being swingable about said hinge from an open position over-lying the forward portion to a closed position rearwardly and downwardly inclined with respect thereto, said side walls of the housing having rearward extensions between which said rearward portion of the top wall unit is disposed when in said closed position, a handle frame member secured to said rearward extensions of said side walls, said handle frame member including means for supporting a container for receiving lawn sweepings, and a container for receiving lawn sweepings supported on said handle frame in rearward alignment with said rear opening of the brush-receiving housing, the rearward portion of the top wall unit when in closed position precluding flow of lawn sweepings from said container into said brush housing when the container is dumped.

2. The structure of claim 1 characterized by the top wall unit being bodily removable from the front and end walls of the housing.

3. In a lawn cleaner body adapted for use with a lawn cleaning brush, a brush-receiving housing comprising a front wall and side walls defining a rear opening and a bottom opening, a top wall unit including a forward portion secured to said housing and a rearward portion hingedly connected to the forward portion, said rearward portion being swingable about said hinge from an open position over-lying the forward portion to a closed position rearwardly and downwardly inclined with respect thereto, said side walls of the housing having rearwardly directed terminal portions between which said rearward portion of the top wall unit is disposed when in said closed position, a handle frame member secured to said housing and extending rearwardly and upwardly therefrom, and a container for receiving lawn sweepings supported on said handle frame in rearward alignment with said rear opening of the brush-receiving housing, the lower edge of the rearward portion of the top wall unit when in closed position being disposed in close proximity to the bottom of said container thereby precluding flow of lawn sweepings from said container into said brush housing when the container is dumped.

FRANK D'ASTICI.

REFERENCES CITED

The following references are of record in the file of this patent:

UNITED STATES PATENTS

| Number | Name | Date |
|---|---|---|
| 283,415 | Passmore | Aug. 21, 1883 |
| 336,728 | Mack | Feb. 23, 1886 |
| 370,361 | Twiggs | Sept. 20, 1887 |
| 426,882 | Thompson | Apr. 29, 1890 |
| 435,183 | Latham | Aug. 26, 1890 |
| 810,547 | Menzies | Jan. 23, 1906 |
| 969,556 | Neisler | Sept. 6, 1910 |
| 1,507,317 | Laberge | Sept. 2, 1924 |
| 1,580,600 | Holbrook | Apr. 13, 1926 |
| 1,911,535 | Schultze | May 30, 1933 |
| 1,939,385 | Burr | Dec. 12, 1933 |
| 2,361,637 | Lathrop | Oct. 31, 1944 |